(12) United States Patent
Takahashi et al.

(10) Patent No.: US 10,083,569 B2
(45) Date of Patent: Sep. 25, 2018

(54) GAMING MACHINE

(71) Applicant: Konami Digital Entertainment Co., Ltd., Tokyo (JP)

(72) Inventors: Yukie Takahashi, Tokyo (JP); Takahiro Yoshino, Tokyo (JP); Koichi Tomita, Tokyo (JP)

(73) Assignee: KONAMI DIGITAL ENTERTAINMENT CO., LTD., Tokyo (JP)

( * ) Notice: Subject to any disclaimer, the term of this patent is extended or adjusted under 35 U.S.C. 154(b) by 61 days.

(21) Appl. No.: 15/202,876

(22) Filed: Jul. 6, 2016

(65) Prior Publication Data

US 2016/0314648 A1 Oct. 27, 2016

Related U.S. Application Data

(63) Continuation-in-part of application No. PCT/JP2014/080483, filed on Nov. 18, 2014.

(30) Foreign Application Priority Data

Jan. 23, 2014 (JP) ................. 2014-010630

(51) Int. Cl.
G07F 17/00 (2006.01)
G07F 17/32 (2006.01)
A63F 13/90 (2014.01)
B44F 1/04 (2006.01)
B44F 1/10 (2006.01)
A63F 9/06 (2006.01)

(52) U.S. Cl.
CPC ........ *G07F 17/3216* (2013.01); *A63F 9/0613* (2013.01); *A63F 13/90* (2014.09); *B44F 1/04* (2013.01); *B44F 1/10* (2013.01); *G07F 17/3202* (2013.01); *A63F 2009/0623* (2013.01)

(58) Field of Classification Search
CPC ... G07F 17/32; G07F 17/3202; G07F 17/3216
USPC ......................................................... 463/46
See application file for complete search history.

(56) References Cited

U.S. PATENT DOCUMENTS

| 4,748,543 | A | * | 5/1988 | Swarens | .................. | F21S 8/02 |
| | | | | | | 362/147 |
| 6,880,825 | B2 | * | 4/2005 | Seelig | ..................... | G07F 17/32 |
| | | | | | | 273/143 R |
| 9,084,939 | B2 | | 7/2015 | Masuda et al. | | |
| 2007/0225079 | A1 | * | 9/2007 | Cole | ...................... | G07F 17/32 |
| | | | | | | 463/46 |

(Continued)

FOREIGN PATENT DOCUMENTS

| JP | 2000-084251 A | 3/2000 |
| JP | 2003-088616 A | 3/2003 |

(Continued)

*Primary Examiner* — William H McCulloch, Jr.
*Assistant Examiner* — Chase Leichliter
(74) *Attorney, Agent, or Firm* — Sughrue Mion, PLLC

(57) ABSTRACT

A gaming machine comprises: a gaming machine body; a recessed portion formed on the gaming machine body, being recessed from a front side to a back side of the gaming machine body, and having an inner side surface, the inner side surface being a reflective surface; and a reflective object at least partially positioned in a space defined by the recessed portion, and formed with a reflected image by means of the reflective surface.

8 Claims, 15 Drawing Sheets

(56) References Cited

U.S. PATENT DOCUMENTS

| | | | |
|---|---|---|---|
| 2007/0265099 A1* | 11/2007 | Cole | G07F 17/32 463/46 |
| 2007/0287527 A1* | 12/2007 | Tanabe | G07F 17/32 463/20 |
| 2007/0287528 A1* | 12/2007 | Hirato | G07F 17/32 463/20 |
| 2007/0287538 A1* | 12/2007 | Ishikawa | G07F 17/32 463/31 |
| 2007/0287544 A1* | 12/2007 | Hirato | G07F 17/32 463/46 |
| 2008/0153569 A1 | 6/2008 | Tanabe | |
| 2009/0227380 A1* | 9/2009 | Seelig | G07F 17/32 463/46 |
| 2014/0087888 A1* | 3/2014 | Chudek | G07F 17/3202 463/46 |

FOREIGN PATENT DOCUMENTS

| | | |
|---|---|---|
| JP | 2007-325881 A | 12/2007 |
| JP | 5068339 B2 | 11/2012 |
| WO | 2009/048001 A1 | 4/2009 |

* cited by examiner

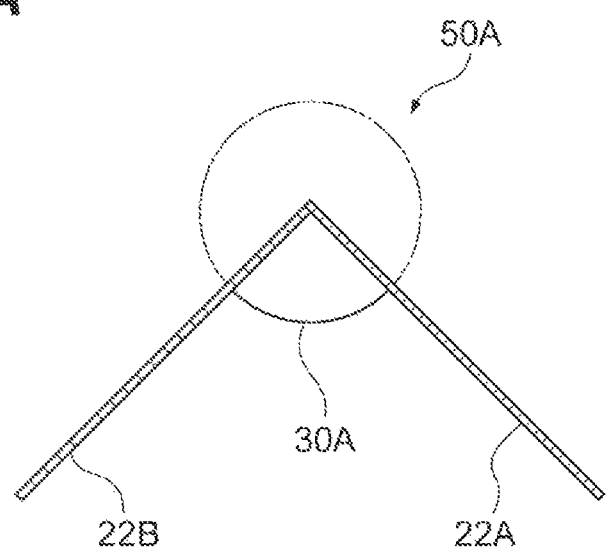

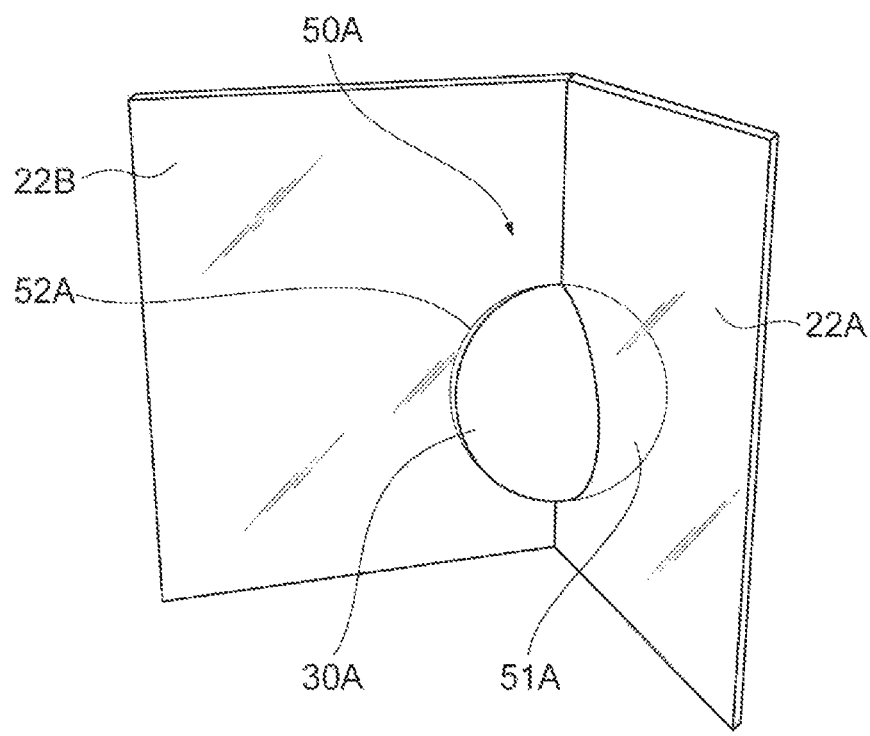

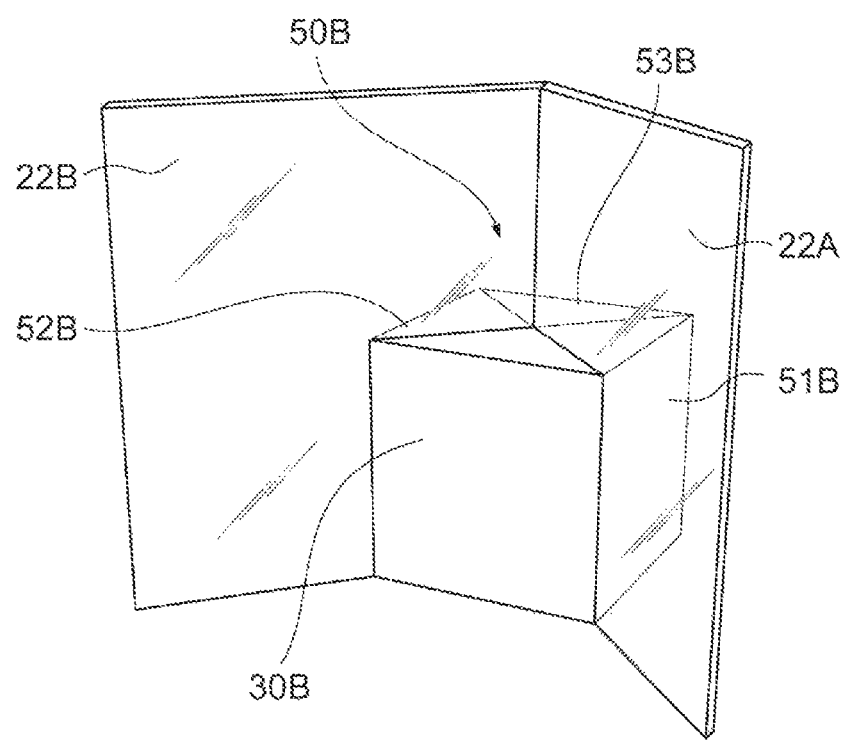

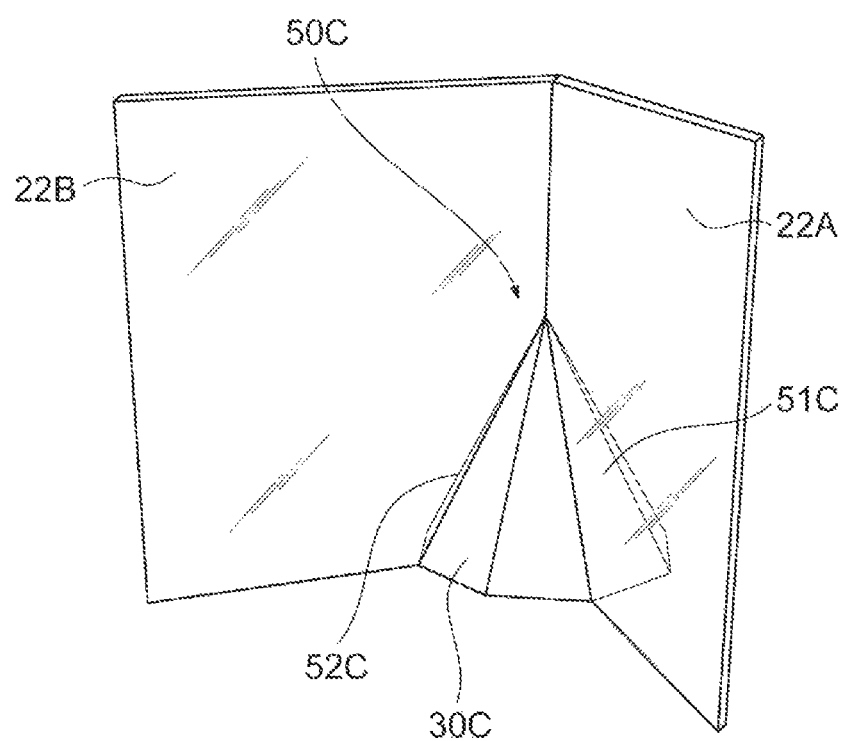

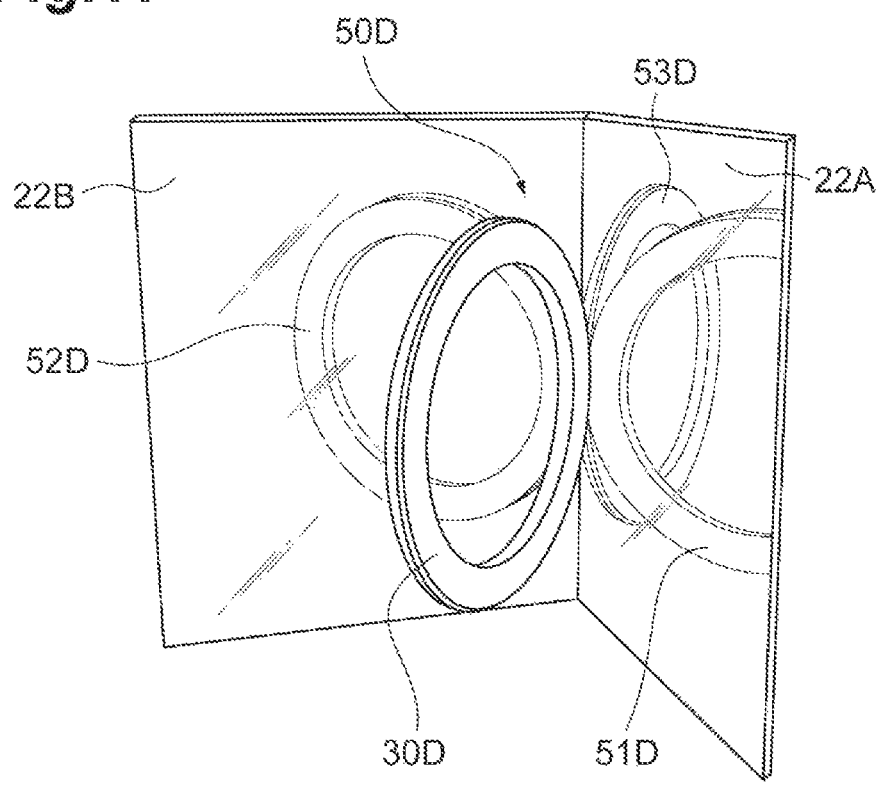

US 10,083,569 B2

GAMING MACHINE

CROSS-REFERENCE TO RELATED APPLICATION

This application is a continuation of International Application No. PCT/JP2014/080483, filed Nov. 18, 2014. Note that this application claims the benefit of priority from Japanese Patent Application No. 2014-010630, and the entire content of the basic application is incorporated herein.

TECHNICAL FIELD

The present disclosure relates to a gaming machine.

BACKGROUND ART

Gaming machines which are placed in an amusement facility such as a gaming arcade generally include a display portion for displaying a game image, a speaker, and various decorations as disclosed in Patent Literature 1 (e.g., FIG. 1) and Patent Literature 2 (e.g., FIG. 2) described below.

Decorations are intended to draw attention of players and customers around the gaming machine, so that the decorations are usually provided in a position in which gaze can easily be drawn (e.g., around the display portion). Therefore, spots which are not suitable for attachment of decorations (e.g., a lower part of the housing near the foot of the player) are often provided with an undecorated maintenance door or, in some gaming machines, with a low-pitch reproduction speaker (woofer) or the like.

CITATION LIST

Patent Literature

Patent Literature 1: Japanese Unexamined Patent Publication No. 2000-84251
Patent Literature 2: International Publication No. 2009/48001

SUMMARY OF INVENTION

Technical Problem

As described above, in conventional gaming machines, the attachment spot for decorations is subjected to practical limitations. For example, the lower part of the housing is a dead space in terms of decoration. However, even spaces such as the lower part of the housing may be sufficiently used as a decorative space insofar as the gaze of nearby customers can be drawn, thereby increasing the appeal of the gaming machine.

In the present technical field, it is desired that a gaming machine that allows increased appeal to nearby customers is provided.

Solution to Problem

A gaming machine according to an aspect of the present disclosure comprises: a gaming machine body; a recessed portion formed on the gaming machine body, being recessed from a front side to a back side of the gaming machine body, and having an inner side surface, the inner side surface being a reflective surface; and a reflective object at least partially positioned in a space defined by the recessed portion, and formed with a reflected image by means of the reflective surface.

BRIEF DESCRIPTION OF DRAWINGS

FIG. 8A is a view illustrating a reflective object of a different aspect.
FIG. 8B is a view illustrating the reflective object of the different aspect.
FIG. 9 is a view illustrating a reflective object of a different aspect.
FIG. 10 is a view illustrating a reflective object of a different aspect.
FIG. 11 is a view illustrating a reflective object of a different aspect.

DESCRIPTION OF EMBODIMENTS

Figure 1:
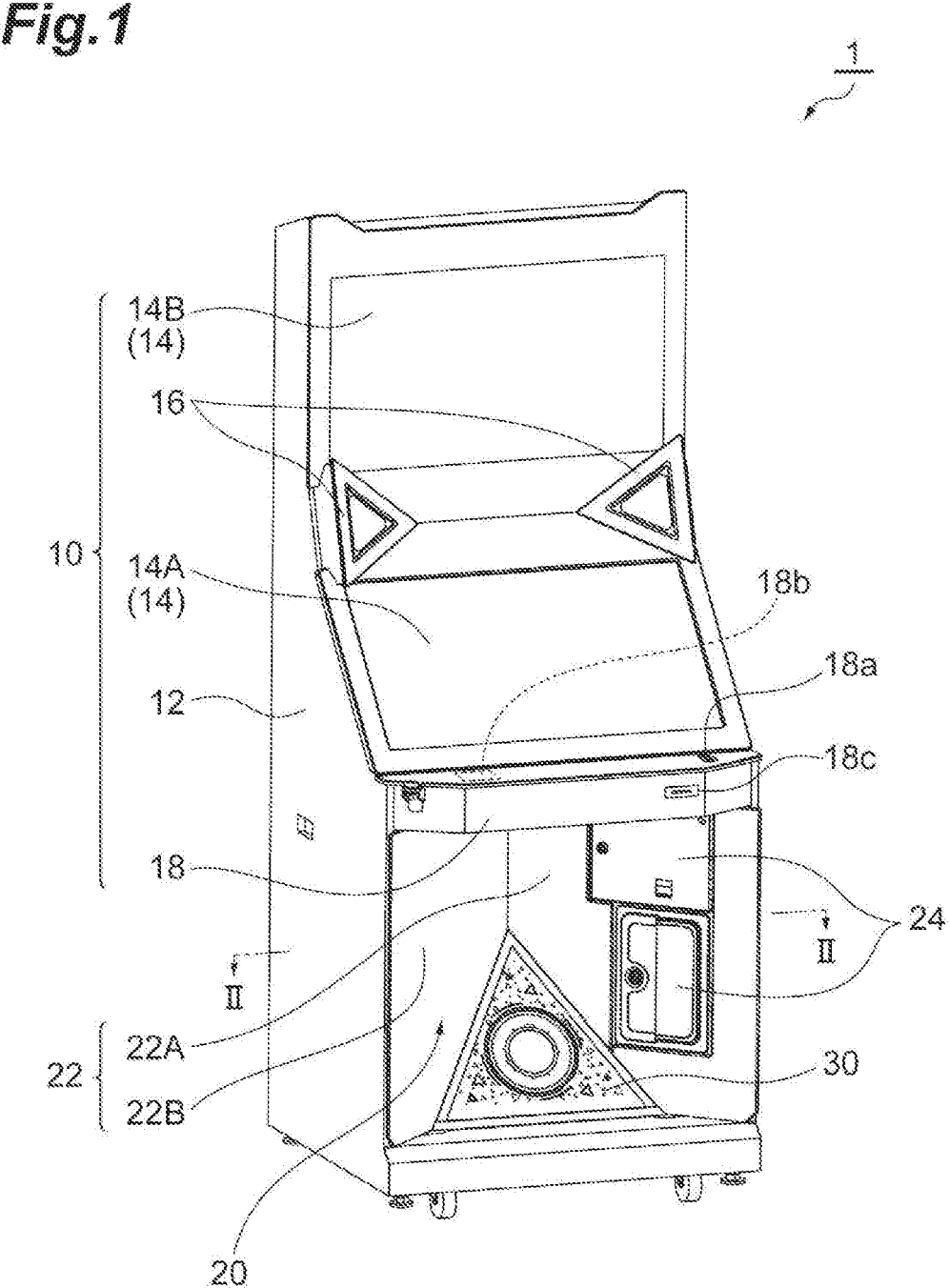
FIG. 1 is a perspective view of a gaming machine according to an embodiment.

In the following, an embodiment of the present disclosure is described with reference to the accompanying drawings. In the drawings, like or corresponding parts are designated with like reference numerals, and the same descriptions are omitted.

A gaming machine 1 according to the embodiment is a machine which is placed in an amusement facility such as a gaming arcade and provides a game through which music-related play is enjoyed (generally called a music game or a rhythm game). Specifically, the game the gaming machine 1 provides is progressed as a player performs touch panel operations to music and rhythms.

First, the physical configuration of the gaming machine 1 is described. As illustrated in FIG. 1, the gaming machine 1 comprises a gaming machine body 10. The gaming machine body 10 has a housing 12, a monitor 14, speakers 16, and a front panel 18.

The gaming machine body 10 has a front side and a back side. The front side is a side that faces the player playing the gaming machine 1. Furthermore, the front side is a side which is exposed when the gaming machine 1 is arranged alone or when multiple gaming machines 1 are arranged. The back side is the opposite side of the front side. The aforementioned monitor 14, speakers 16, and front panel 18 are disposed on the front side of the gaming machine body 10.

The housing 12 is a longitudinal box which is long in a height direction. The housing 12 accommodates therein an apparatus, cables, a circuit board and the like, which are required for providing a game.

The monitor 14 is arranged on an upper side of the housing 12. The monitor 14 includes a main monitor 14A and a sub-monitor 14B, which are arranged vertically. The lower main monitor 14A is a touch panel-type liquid-crystal display. The main monitor 14A has a function as a display device for displaying the contents or results of a game during a game or demo screen during standby, and a function as an operation input device for receiving operations from a player. The upper sub-monitor 14B is mainly used for displaying game rules and for rendering with respect to nearby customers. The sub-monitor 14B is sometimes used for displaying a game-related image during play of a game.

The speakers 16 are provided in right and left pairs at a level between the main monitor 14A and the sub-monitor 14B of the housing 12. The speakers 16 output game-related music and sound effects and output demo screen-related music and sound effects during standby.

The front panel 18 is an overhang portion overhanging from the front side of the gaming machine body 10. More specifically, the front panel 18 is an eaves-shaped portion, which is disposed below the main monitor 14A and above a recessed portion 20 to be described below, and overhanging a predetermined length on the front side of the gaming machine body 10 (i.e., on the player side). In an aspect illustrated in FIG. 1, the front panel 18 is provided with devices such as a coin receiving portion 18*a*, a card reader/writer 18*b*, and a plug-in port 18*c*.

The coin receiving portion 18*a* is a portion through which a player drops a coin to play a game. The coin dropped is received in a receiving portion in the housing 12 to be described below.

The card reader/writer 18*b* is a device for performing reading and writing with respect to an ID card of a player. When an ID card is placed over a predetermined region of the card reader/writer 18*b*, processing of reading a player ID or a personal data, e.g., game results, from the ID card or writing updated personal data into the ID card is performed.

The plug-in port 18*c* is a portion into which the plug of headphones is inserted. The plug-in port 18*c* enables the headphones to output game-related music and sound effects instead of the speakers 16.

The front panel 18 may not have the aforementioned coin receiving portion 18*a*, card reader/writer 18*b*, or plug-in port 18*c*. In addition, the front panel 18 may have a predetermined button, lever, or the like so that the front panel 18 takes the form of a control panel for receiving game-related operations from the player.

Regarding the aforementioned gaming machine body 10, the recessed portion 20 is formed on the housing 12 below the front panel 18.

Figure 2:
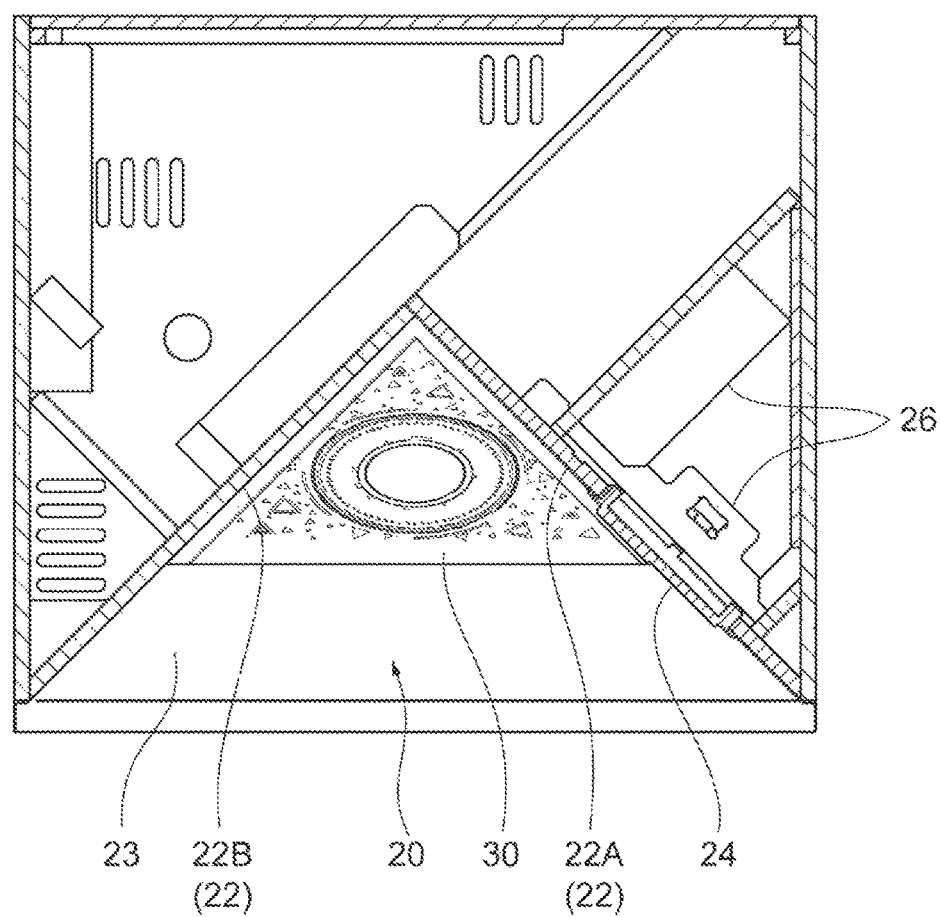
FIG. 2 is a cross-sectional view of the gaming machine taken along the line II-II of FIG. 1.

As illustrated in FIG. 2, the recessed portion 20 is recessed from the front side to the back side of the gaming machine body 10. An inner side surface 22 of the recessed portion 20 includes a right side surface 22A positioned at the right side of the recessed portion 20 as viewed from the front side and a left side surface 22B positioned at the left side of the recessed portion 20 as viewed from the front side. Each of the right side surface 22A and the left side surface 22B is planar. In the present embodiment, all surfaces except for the portion of an access door 24 to be described below are reflective surfaces that can produce specular reflection.

The right side surface 22A and the left side surface 22B are arranged such that the normals of the surfaces intersect on the front side. Furthermore, the right side surface 22A and the left side surface 22B are arranged so as to be perpendicular to one another. Therefore, a right-angled corner portion is formed at the connection between the right side surface 22A and the left side surface 22B. The right side surface 22A and the left side surface 22B are substantially identical in dimension. Thus, the recessed portion 20 is recessed so as to be bilaterally symmetric. More specifically, as illustrated in the cross-sectional view of FIG. 2, the space defined by the inner side surface 22 of the recessed portion 20 is bilaterally symmetric and has an isosceles right triangular prism shape.

The access door 24 (an example of the access portion) is disposed at an upper side of the right side surface 22A of the recessed portion 20. The access door 24 is communicated with the internal space of the housing 12 of the gaming machine body 10. When the access door 24 is opened, maintenance equipment 26 arranged in the internal space of the gaming machine body 10 becomes accessible from the front side of the gaming machine body 10. The maintenance equipment 26 includes a portion for receiving a coin dropped into the coin receiving portion 18*a* and an adjustment module which is used by an employee of an amusement facility for adjustment of various settings of the gaming machine 1. Other than being in the form of a door, the access portion may be in the form of a lid-shaped member which is attachable and detachable with respect to the inner side surface.

Figure 3:
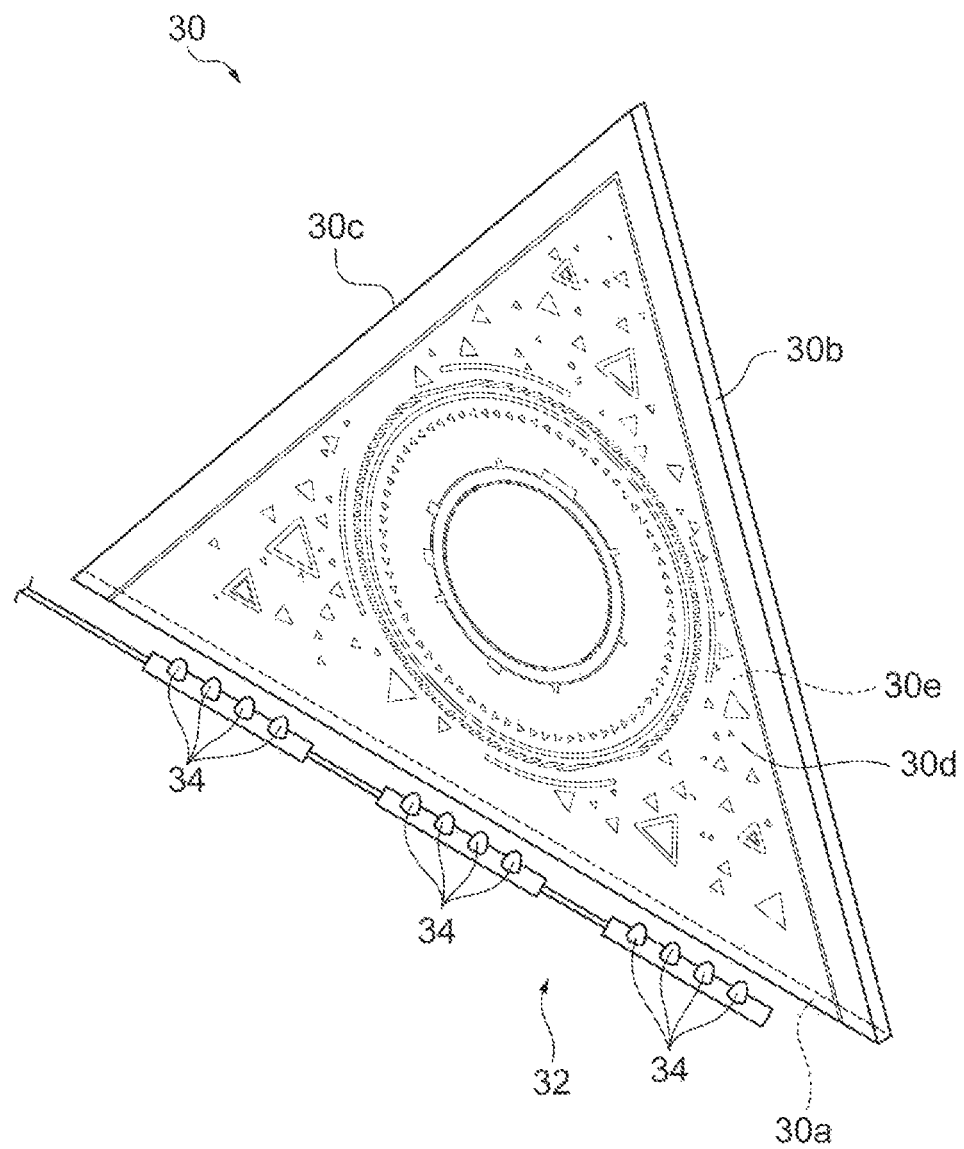
FIG. 3 is a view illustrating a reflective object according to the embodiment.

A reflective object 30, which is a light-transmissive panel, is arranged on an inner side of the recessed portion 20. As illustrated in FIG. 3, the reflective object 30 is an equilateral-triangular plate-shaped member with a predetermined thickness. The reflective object 30 is formed of a light-transmissive material (e.g., acrylic resin).

The reflective object 30 is arranged to be leant against the inner side surface 22 of the recessed portion 20. More specifically, the reflective object 30 is arranged so that one end face 30*a* of the reflective object 30 faces a floor surface 23 of the recessed portion 20 and the other end faces 30*b*, 30*c* face the right side surface 22A and the left side surface 22B, respectively. The end faces 30*b*, 30*c* of the reflective object 30 are respectively in direct contact with the right side surface 22A and the left side surface 22B.

Figure 4:
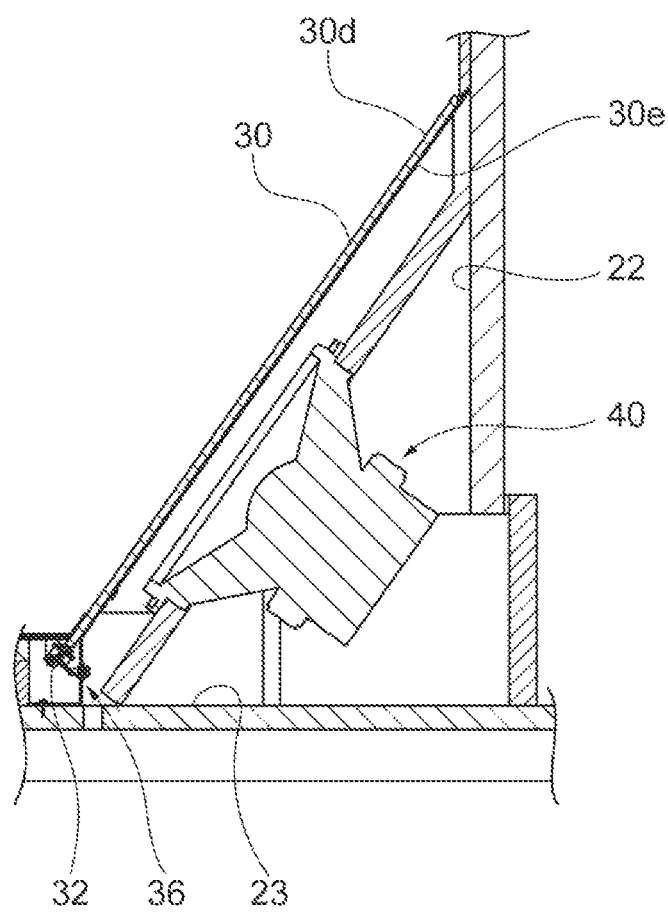
FIG. 4 is a longitudinal sectional view of a recessed portion of the gaming machine of FIG. 1.

As illustrated in FIG. 3, LEDs 32 are attached to the end face 30*a* of the reflective object 30 as light sources of incident light to the reflective object 30. Specifically, multiple full-color LED elements 34 (12 elements in FIG. 3) are arranged side by side along the end face 30*a* of the reflective object 30. The optical axis of each element 34 faces the end face 30*a*. As described above, since the LEDs 32 are attached to the end face 30*a* of the reflective object 30, as illustrated in FIG. 4, the reflective object 30 is not in direct contact with the floor surface 23, but is in a state of being off the floor surface 23. The reflective object 30 is supported from a rear surface 30*e* by a support 36.

When light from the LEDs 32 is incident on the end face 30*a* of the reflective object 30, light which has reached the other two end faces 30*b*, 30*c* is output from the two end faces 30*b*, 30*c*. In order not to block such output of light from the end faces 30*b*, 30*c*, when the end faces 30*b*, 30*c* are fixed to the inner side surface 22, a fastener is not attached to the end faces 30*b*, 30*c*, but is attached to a front surface 30*d* or the rear surface 30*e* in the vicinity of the end faces 30*b*, 30*c*.

As the light source, a single-color LED element or an EL element may be used in addition to the full-color LED element.

The front surface 30d and the rear surface 30e of the reflective object 30 may be planar, but may include patterns as illustrated in FIG. 3. Patterns may be formed, for example, by printing, grooving, or surface roughening, e.g., blasting. Such patterns may be formed on either the front surface 30d or the rear surface 30e.

In a space on the farther side of the reflective object 30 arranged in the recessed portion 20 (i.e., a space defined by the reflective object 30, the inner side surface 22, and the floor surface 23), as illustrated in FIG. 4, a low-pitch reproduction speaker (woofer) 40 is arranged pointing the reflective object 30. This space does not affect the visual effect of the recessed portion 20 to be described below. Therefore, a gaming machine which does not use the woofer 40 may be empty. Alternatively, the inner side surface 22 of the recessed portion 20 may be expanded to fill up the space.

Figure 5:
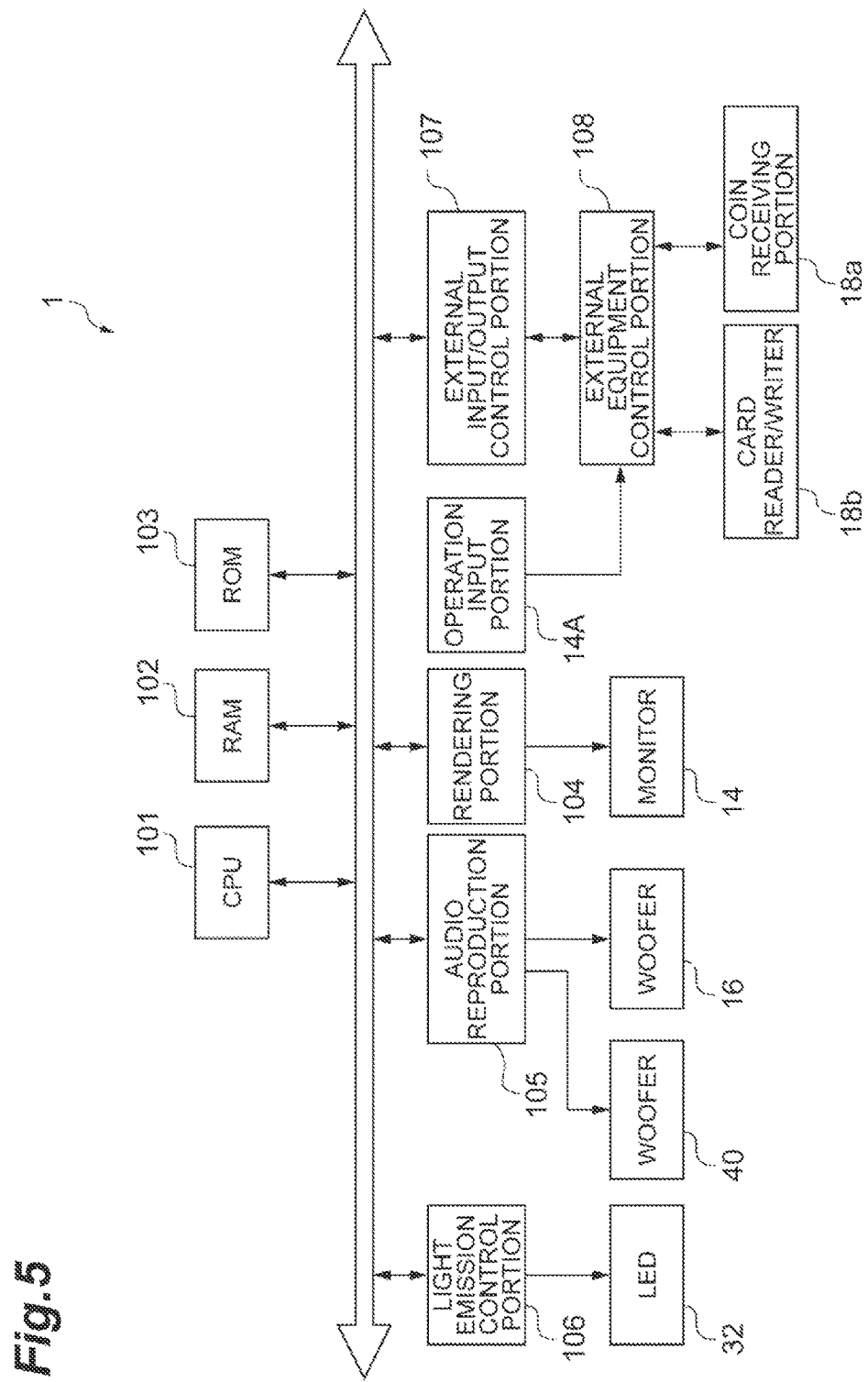
FIG. 5 is a block diagram of a control system of the gaming machine of FIG. 1.

Next, the configuration of a control system of the gaming machine 1 is described with reference to FIG. 5.

The gaming machine 1 comprises, in the aforementioned gaming machine body 10, a CPU 101, a RAM 102, a ROM 103 and the like, which are elements for mainly performing internal processing. The CPU 101 carries out various types of processing required for providing a game on the basis of a control program or game data stored in the ROM 103. The RAM 102 temporarily stores various pieces of game data including various variables and parameters. The ROM 103 stores a control program, various parameters or the like.

Furthermore, the gaming machine 1 comprises a rendering portion 104, an audio reproduction portion 105, a light emission control portion 106, an external input/output control portion 107, and an external equipment control portion 108, which are elements related to external input and output.

The rendering portion 104 generates data of an image to be displayed on the monitor 14.

The audio reproduction portion 105 generates data of game-related music and sound effects to be output to the speakers 16 and the woofer 40.

The light emission control portion 106 controls light emission of the LEDs 32 illustrated in FIG. 3. More specifically, the light emission control portion 106 controls the timing of emission, the color of emission, the intensity of emission or the like of the LED elements 34 of the LEDs 32. Examples of the emission form of the LEDs 32 include continuous lighting and blinking. The LED elements 34 of the LEDs 32 may be controlled to be illuminated sequentially. Regarding the timing of emission of the LEDs 32, the LEDs 32 may be illuminated in conjunction with a progress status of a game or music. The LEDs 32 may be illuminated regardless of a progress status of a game or music.

The external input/output control portion 107 generates a control signal with respect to external equipment such as the coin receiving portion 18a, the card reader/writer 18b, and an operation input portion for inputting a signal regarding touch panel operations of the main monitor 14A. Furthermore, the external input/output control portion 107 receives a detection signal from the external equipment and sends the detection signal to the CPU 101.

The external equipment control portion 108 performs control such as receipt of various inputs from external equipment such as the coin receiving portion 18a, the card reader/writer 18b, and the operation input portion for inputting a signal regarding touch panel operations of the main monitor 14A.

Figure 6:
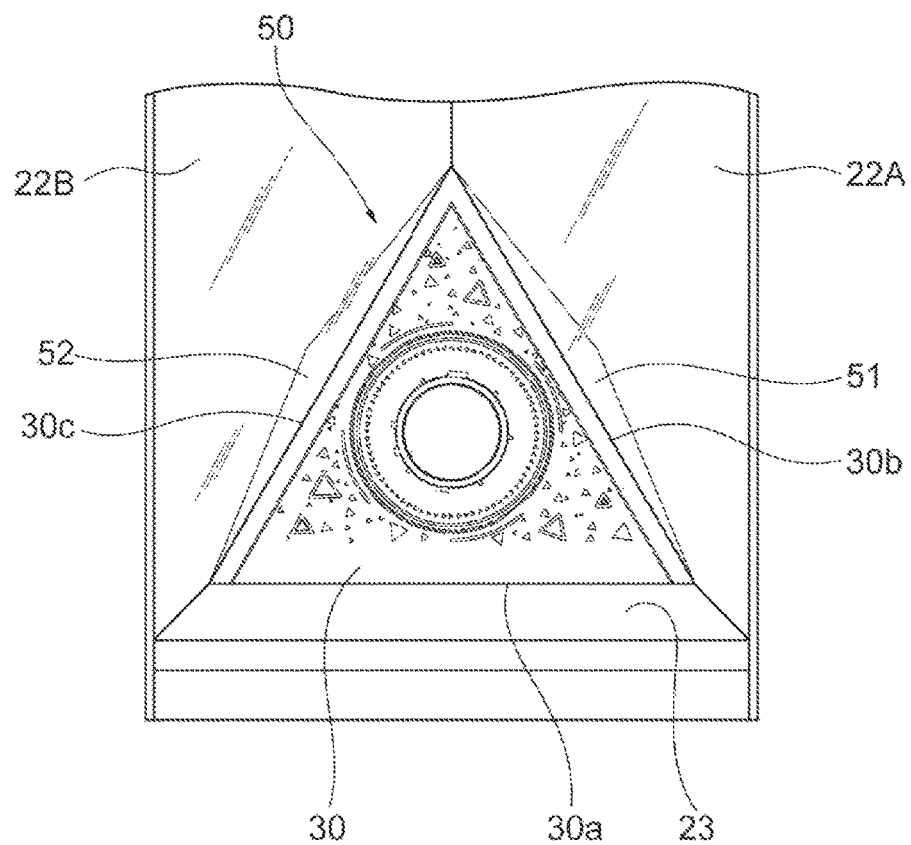
FIG. 6 is a schematic view viewed from the front side of the gaming machine illustrating a visual effect with the real image and the reflected image of the reflective object.
Figure 7:
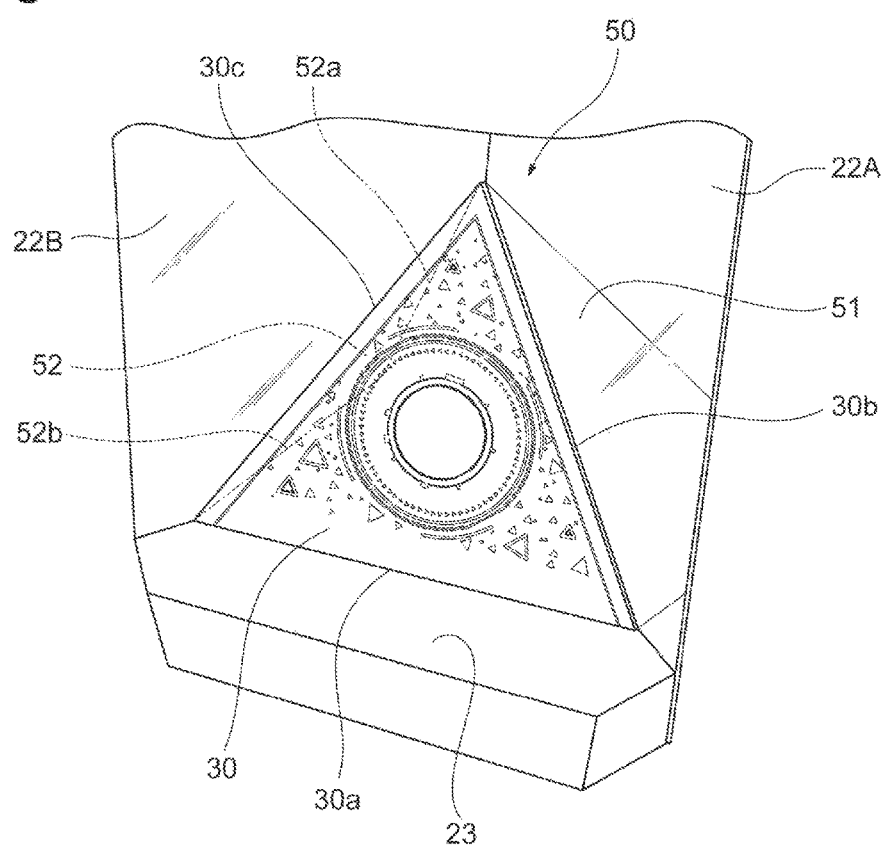
FIG. 7 is a schematic perspective view of the gaming machine illustrating the visual effect with the real image and the reflected image of the reflective object.

Next, the visual effect of the recessed portion 20 of the aforementioned gaming machine body 10 is described with reference to FIGS. 6 and 7. In FIGS. 6 and 7, for the sake of easy understanding, the description of the access door 24 is omitted. However, there is only a limited difference regarding the level of a visual effect on the basis of the presence or absence of the access door 24.

FIG. 6 is a schematic view illustrating a visual effect of the recessed portion 20 viewed from the front side of the gaming machine body 10. As illustrated in FIG. 6, when the reflective object 30 is arranged in the internal space defined by the recessed portion 20, on the basis of specular reflection on the right side surface 22A and the left side surface 22B of the inner side surface 22, as viewed from the front side of the gaming machine body 10, as reflected images (mirror image) on the inner side surface 22, a reflected image 51 of the reflective object 30 is projected on the right side surface 22A and a reflected image 52 of the reflective object 30 is projected on the left side surface 22B. In other words, the reflected images 51, 52 of the reflective object 30 can be viewed in addition to the real image of the reflective object 30 from the front side of the gaming machine body 10.

FIG. 7 is a schematic perspective view illustrating a visual effect of the recessed portion 20 as viewed obliquely from a left front side of the gaming machine body 10. Similar to FIG. 6, also in FIG. 7, a reflected image 51 of the reflective object 30 is projected on the right side surface 22A and a reflected image 52 of the reflective object 30 is projected on the left side surface 22B. However, in FIG. 7, the reflected image 52 on the left side surface 22B is projected at the left side surface 22B on the farther side of the reflective object 30. In this case, ridge lines 52a, 52b forming the reflected image 52 are also projected on the left side surface 22B on the farther side of the reflective object 30. Accordingly, the reflected image 52 and its ridge lines 52a, 52b can be viewed obliquely from a left front side of the gaming machine body 10. This is because the reflective object 30 is formed of a light-transmissive material so that the reflected image 52 and its ridge lines 52a, 52b are hardly blocked by the reflective object 30. When the reflective object 30 is not formed of a light-transmissive material and does not have light transmissivity, of course, the reflected image 52 and its ridge lines 52a, 52b cannot be viewed obliquely from a left front side of the gaming machine body 10.

In this case, the end faces 30b, 30c of the reflective object 30 are in contact with the surfaces 22A, 22B, respectively. Therefore, a trick of the eye (optical illusion) that looks as if an integrated stereoscopic image (a pyramid image in FIGS. 6 and 7) 50 is present occurs on the basis of the real image and the reflected images 51, 52 of the reflective object 30, and a three-dimensional visual effect is obtained. Such a visual effect is also obtained when viewed in any directions from the front side of the gaming machine body 10, e.g., a direction from the direct front side illustrated in FIG. 6 and a direction from an obliquely left front side illustrated in FIG. 7. In particular, when viewed from the obliquely left front side of FIG. 7, since the reflective object 30 is formed of a light-transmissive material, the reflected image 52 and its ridge lines 52a, 52b projected on the left side surface 22B on the farther side of the reflective object 30 can be viewed through the reflective object 30. In this way, when the reflected image 52 and its ridge lines 52a, 52b can be viewed, the stereoscopic image 50 can be viewed more three-dimensionally. It is not necessary to mention that, when viewed from an obliquely right front side, the reflected image 51 and its ridge lines can be viewed through the reflective object 30 on the right side surface 22A on the farther side of the reflective object 30.

In particular, since the LEDs 32 are attached to the end face 30a of the reflective object 30, when the LEDs 32 are illuminated, the end faces 30b, 30c are shined in the form of a line. The ridge lines of the stereoscopic image 50 corresponding to the light in the form of a line are emphasized, and the stereoscopic image 50 is projected clearly. The illumination of the LEDs 32 is not necessarily required. Even in cases where the LEDs 32 are not illuminated or the LEDs 32 are not attached to the reflective object 30, the aforementioned three-dimensional visual effect can be obtained by projecting the stereoscopic image 50 in the recessed portion 20 only with natural light or interior light.

The shape of the reflective object 30 is not limited to an equilateral triangular plate shape, but may be a quadrangle or circular plate shape, or a block shape. When the reflective object 30 at least has a shape with a ridge line, a reflected image of the ridge line is projected on the inner side surface and a three-dimensional visual effect is obtained.

In the gaming machine 1 of the present embodiment, a portion where the recessed portion 20 is formed lies below the front panel 18 and is not so visible from the player or nearby customers. Conventional gaming machines do not sufficiently address the use as a decorative space.

Thus, the inventors have conducted studies on a technique for appealing to nearby customers by effectively using a portion which has been considered a dead space in terms of decoration and has arrived at the gaming machine 1 described in the aforementioned embodiment. Specifically, the gaming machine 1 neither adds decorations to nor newly forms a decorative space in the conventional gaming machine, but effectively uses a portion originally provided in the conventional gaming machine as a decorative space. Practically, a portion below the front panel 18, where the recessed portion 20 is formed in the present embodiment, is conventionally provided with an access door for access to maintenance equipment in the housing and is rarely used as a decorative space.

The gaming machine 1 addresses increasing appeal by providing a visual attraction to nearby customers with a three-dimensional visual effect for projecting the stereoscopic image 50 in the recessed portion 20 below the front panel 18. In particular, the appearance of the stereoscopic image 50 when viewed from the direct front side of the gaming machine body 10 differs from the appearance of the stereoscopic image 50 when viewed from an oblique side. Therefore, customers approaching the gaming machine 1 from an oblique side are likely to be interested in as to how the stereoscopic image 50 can be viewed from the direct front side of the gaming machine body 10. Therefore, customers around the gaming machine 1 can easily be led to a direct front position. Thus, the customers obtain a chance to become interested in the game itself of the gaming machine 1, leading to an increase in attractiveness of a game.

The gaming machine 1 is provided with the access door 24 on the right side surface 22A of the recessed portion 20. Therefore, as with the conventional gaming machine, the internal maintenance equipment 26 is accessible from the front side of the gaming machine body 10.

In particular, with the gaming machine 1, a game-related operation input by a player can be received on the touch panel-type main monitor 14A. Therefore, a less number of devices are disposed on the front panel 18, and the overhanging amount on the front side of the front panel 18 is small. Accordingly, it is structured that, although the recessed portion 20 is present in a position overlooked by the player or the nearby customers, when the player or the nearby customers overlook, the front panel 18 hardly blocks the visual effect of the recessed portion 20. In other words, the gaming machine 1 increases visibility of the recessed portion 20 by means of the front panel 18 with less overhanging amount.

The reflective object 30 may not be in contact with the inner side surface 22. When the reflective object 30 is not in contact with the inner side surface 22, the real image and the reflected images 51, 52 of the reflective object 30 are viewed as separate images. In this case, an optical illusion occurs as if a space is present on the farther side (on the back side of the gaming machine 1) of the inner side surface 22 and the reflective object 30 is present in the space. Such an optical illusion also provides a visual attraction and enables appealing to customers around the gaming machine 1.

In addition, an aspect in which the reflective object 30 itself emits light may be used instead of the aforementioned aspect in which light is incident from the light source to the reflective object 30. In other words, the reflective object 30 may be an illuminant. In this case, the reflected images 51, 52 of the reflective object 30 are clearly projected on the right side surface 22A and the left side surface 22B of the inner side surface 22, respectively, and the stereoscopic image 50 (pyramid-shaped image) is projected as a three-dimensional visual effect. In particular, in order to project only a frame part of the stereoscopic image 50, it is only required that an illuminant in the form of a line (e.g., a tube light) is arranged as a reflective object in positions corresponding to the end faces 30a, 30b, 30c of the reflective object 30 instead of the reflective object 30.

It is not necessarily required that the reflective object is generally formed of a light-transmissive material, but the reflective object may be partly formed of a light-transmissive material or formed of a material without light transmissivity. Also, in this case, the reflected image of the reflective object is projected on the inner side surface of the recessed portion, and the aforementioned three-dimensional visual effect is obtained. However, when the reflective object is formed of a light-transmissive material as described in the present embodiment, since, as described above, the three-dimensional visual effect is hardly blocked by the reflective object, the reflected image projected on the inner side surface on the farther side of the reflective object can be used for a visual effect.

Next, the reflective object of a different aspect is described with reference to FIGS. 8A, 8B and 9 to 13.

FIGS. 8A and 8B illustrate an aspect of projecting a spherical stereoscopic image 50A in the recessed portion 20. As the shape of the reflective object 30A according to the present aspect, the shape of a sphere which is divided into quarters relative to the central axis passing the center of the sphere is employed. When the reflective object 30A with such a shape is arranged to fit to a corner portion between the right side surface 22A and the left side surface 22B as illustrated in FIG. 8A, reflected images 51A, 52A illustrated in FIG. 8B are projected, and an optical illusion occurs as if an integrated spherical stereoscopic image 50A is present.

As with the case of the aforementioned embodiment, the spherical stereoscopic image 50A also provides a visual attraction, enabling appealing to customers around the gaming machine 1.

FIG. 9 is an aspect of projecting a cuboid stereoscopic image 50B in the recessed portion 20. As the shape of the reflective object 30B according to the present aspect, a triangular prism with an isosceles right triangular cross-section is employed. When the reflective object 30B with such a shape is arranged to fit to a corner portion between the right side surface 22A and the left side surface 22B, reflected images 51B, 52B, 53B are projected, and an optical illusion occurs as if an integrated cuboid stereoscopic image 50B is present.

As with the case of the aforementioned embodiment, the cuboid stereoscopic image 50B also provides a visual attraction, enabling appealing to customers around the gaming machine 1.

FIG. 10 is an aspect of projecting a regular octagonal pyramid-shaped stereoscopic image 50C in the recessed portion 20. As the shape of the reflective object 30C according to the present aspect, the shape of a regular octagonal pyramid which is divided into quarters along the ridge lines relative to the central axis passing the center of the regular octagonal pyramid (i.e., the normal of the bottom surface passing the top). When the reflective object 30C with such a shape is arranged to fit to a corner portion between the right side surface 22A and the left side surface 22B, reflected images 51C, 52C are projected, and an optical illusion occurs as if an integrated regular octagonal pyramid-shaped stereoscopic image 50C is present.

As with the case of the aforementioned embodiment, the regular octagonal pyramid-shaped stereoscopic image 50C also provides a visual attraction, enabling appealing to customers around the gaming machine 1.

FIG. 11 is an aspect of projecting a stereoscopic image 50D by arranging a ring-shaped reflective object 30D in the recessed portion 20. The ring-shaped reflective object 30D is arranged in an orientation and position in which the ring-shaped reflective object 30D is in contact with a corner portion between the right side surface 22A and the left side surface 22B and the corner portion is divided into halves (i.e., at an angle of 45 degrees from the right side surface 22A and the left side surface 22B). When the ring-shaped reflective object 30D is arranged in such a manner, ring-shaped reflected images 51D, 52D, 53D are projected, and an optical illusion occurs as if a stereoscopic image 50D with the four rings being integrally coupled is present.

As with the case of the aforementioned embodiment, the stereoscopic image 50D also provides a visual attraction, enabling appealing to customers around the gaming machine 1. The reflective object 30D may be of a disk shape, not of a ring shape.

Figure 12:
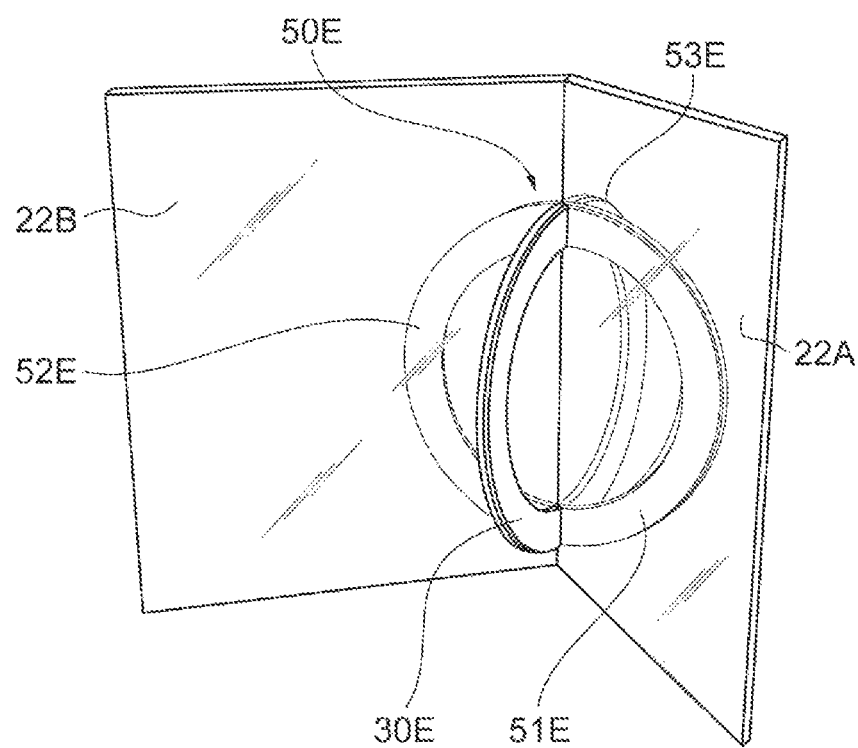
FIG. 12 is a view illustrating a reflective object of a different aspect.

FIG. 12 is an aspect of projecting a stereoscopic image 50E by arranging a semi-ring-shaped reflective object 30E in the recessed portion 20. The semi-ring-shaped reflective object 30E is arranged in an orientation and position in which the semi-ring-shaped reflective object 30E is in contact with a corner portion between the right side surface 22A and the left side surface 22B and the corner portion is divided into halves (i.e., at an angle of 45 degrees from the right side surface 22A and the left side surface 22B). When the semi-ring-shaped reflective object 30E is arranged in such a manner, semi-ring-shaped reflected images 51E, 52E, 53E are projected, and an optical illusion occurs as if a stereoscopic image 50E with the two rings being perpendicularly crossing is present.

As with the case of the aforementioned embodiment, the stereoscopic image 50E also provides a visual attraction, enabling appealing to customers around the gaming machine 1. The reflective object 30E may be of a semi-disk shape, not of a semi-ring shape (arc shape).

Figure 13:
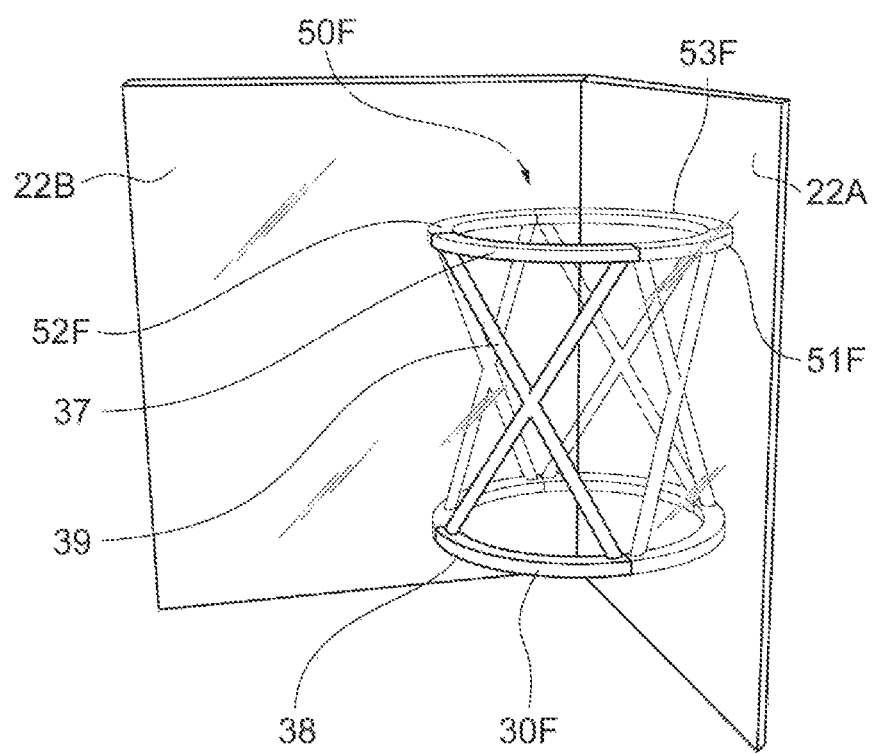
FIG. 13 is a view illustrating a reflective object of a different aspect.

FIG. 13 is an aspect of projecting a stereoscopic image 50F by arranging a reflective object 30F with a frame structure in the recessed portion 20. The reflective object 30F is formed of curved portions 37, 38 arranged in upper and lower positions, respectively, and an X-shaped linking portion 39 connecting in a crossing manner the ends of the curved portions 37, 38. The curved portions 37, 38 each have a shape of a perfect circular ring which is divided into quarters and are horizontally arranged so that the end faces face the right side surface 22A and the left side surface 22B.

When the reflective object 30F with such a frame structure is arranged at a corner portion between the right side surface 22A and the left side surface 22B, reflected images 51F, 52F, 53F with a frame structure are projected, and an optical illusion occurs as if a cylindrical stereoscopic image 50F with a mesh-shaped circumferential side surface is present.

As with the case of the aforementioned embodiment, the stereoscopic image 50F also provides a visual attraction, enabling appealing to customers around the gaming machine 1.

In particular, with the configuration according to the aspects exemplified in FIGS. 8A, 8B and 9 to 13, a three-dimensional visual effect can be obtained whereby multiple reflected images of the reflective objects 30A to 30F are arranged at intervals around the connection between the right side surface 22A and the left side surface 22B. Such a visual effect is not limited to the aspects illustrated in FIGS. 8A, 8B and 9 to 13, but further various aspects may be employed.

The aspects exemplified in FIGS. 8A, 8B and 9 to 13 all indicate the manner of arranging the reflective objects 30A to 30F with a predetermined shape in the recessed portion 20. However, a further alternative would be to form a hole with a predetermined shape on the inner side surface 22 of the recessed portion 20 and partially expose an object arranged in the housing 12 through the hole. In one example, according to the aspects illustrated in FIGS. 8A and 8B, when a sphere is arranged in the housing 12 and only a part of the sphere having the same shape as the reflective object 30A is exposed through a hole formed on the inner side surface 22, the spherical stereoscopic image 50A illustrated in FIG. 8B is projected.

Furthermore, similar to the reflective object 30, the reflective objects 30A to 30F exemplified in FIGS. 8A, 8B and 9 to 13 may be formed of a light-transmissive material, may be formed of a material without light transmissivity, or may be an illuminant.

The present disclosure is not limited to the aforementioned embodiments, but may be carried out in an appropriate form.

For example, the recessed portion may be provided above the front panel (e.g., above the sub-monitor 14B) where necessary. However, it is preferable for the recessed portion to be provided below the front panel as the space that is not conventionally used as a decorative space is effectively used and the portion below the front panel is not brought into the player's field of vision during a game.

The shape of the recessed portion is not limited to a shape with a triangular cross section illustrated in FIG. 2 or the like, but may be a shape with a trapezoidal cross section whereby the right side surface and the left side surface are separated in the right and left direction in FIG. 2 and the like. In addition, an angle formed by the right side surface and the left side surface defining the recessed portion is not limited to 90 degrees, but may be widened or narrowed as necessary. Furthermore, in the aforementioned embodiments, the case in which the inner side surface of the recessed portion includes the planar right and left side surfaces is described by way of example. However, the inner side surface of the recessed portion may be in part or in whole of a spherical shape.

Figure 14:
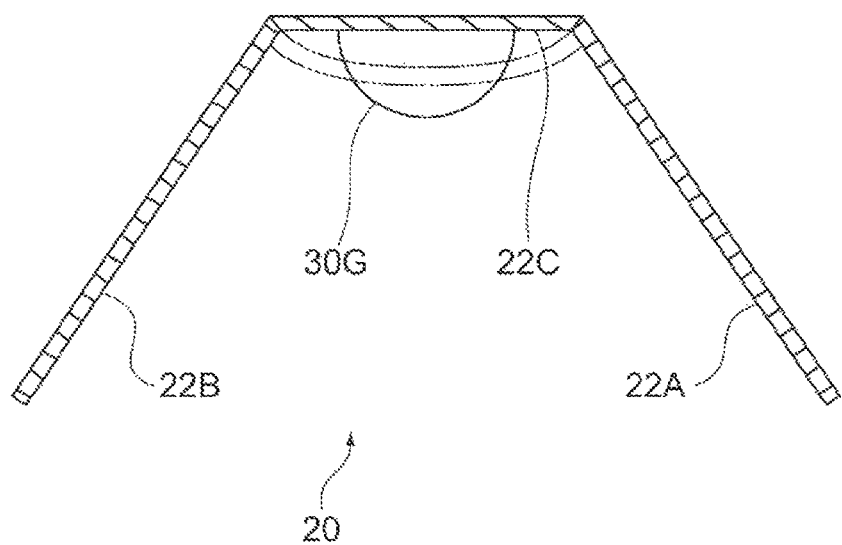
FIG. 14 is a view illustrating a recessed portion of a different aspect.

FIG. 14 illustrates an example of a variant of the recessed portion. The recessed portion 20 illustrated in FIG. 14 has a trapezoidal cross section. The recessed portion 20 of FIG. 14 is defined by a planar back side surface 22C situated between the aforementioned right side surface 22A and left side surface 22B, the right side surface 22A, and the left side surface 22B. The back side surface 22C is a surface the normal of which points the front side (the downward direction in FIG. 14) of the gaming machine body. The back side surface 22C is a reflective surface that can produce specular reflection. On the inner side of the recessed portion 20 of FIG. 14, a reflective object 30G which has, e.g., a hemispherical shape and which is an illuminant may be arranged. The reflective object 30G is attached to the back side surface 22C with its planar side facing the back side surface 22C. In the aspect illustrated in FIG. 14, reflected images of the reflective object 30G are projected on the right side surface 22A and the left side surface 22B, and a reflected image of the reflective object 30G is also projected on a region of the back side surface 22C which is not covered by the reflective object 30G. In this way, even in the recessed portion 20 with a trapezoidal cross section illustrated in FIG. 14, a three-dimensional visual effect can be produced when the reflected images of the reflective object 30G are projected on the right side surface 22A, the left side surface 22B, and the back side surface 22C. The back side surface 22C of the recessed portion 20 of FIG. 14 is not limited to the planar shape described above, but may be, for example, of a curved shape which is curved to protrude toward the front side of the gaming machine body as indicated by the two-dot chain line in FIG. 14 or a curved shape which is curved to protrude toward the back side.

Furthermore, in the aforementioned embodiments, the inner side surface except for the portion of the access door 24 is a reflective surface which is capable of producing specular reflection. However, the entire surface of the inner side surface including the access door may be a reflective surface. The inner side surface may not entirely be a reflective surface, but may partially be a reflective surface. However, in order to obtain a favorable visual effect in the recessed portion 20, at least the surface near the front side relative to the reflective object may be entirely a reflective surface. In order for the inner side surface to be partially a reflective surface, it is sufficient that a mirror plate or a highly reflective film is attached, highly reflective resin is coated, or a highly reflective member is used for the inner side surface.

Furthermore, the reflective object is not necessarily required to be entirely accommodated in the space defined by the recessed portion as explained previously, but an aspect in which the reflective object is partially accommodated may be allowed. Also, in this case, a reflected image of at least a part of the reflective object is projected on the inner side surface of the recessed portion as explained previously, and the aforementioned three-dimensional visual effect is obtained.

In addition, although the gaming machine 1 for providing a game for enjoying music-related play is described in the aforementioned embodiments, gaming machines for providing other games may be allowed.

A gaming machine according to an aspect of the present disclosure comprises a gaming machine body (1), a recessed portion (20) formed on the gaming machine body, being recessed from the front side to the back side of the gaming machine body, and having an inner side surface, the inner side surface being a reflective surface, and a reflective object (30) at least partially positioned in a space defined by the recessed portion, and formed with a reflected image by means of the reflective surface.

In an embodiment, an aspect may be allowed in which the inner side surface (22) of the recessed portion includes a planar right side surface (22A) positioned on the right side of the recessed portion when viewed from the front side and a planar left side surface (22B) positioned on the left side of the recessed portion when viewed from the front side, and the right side surface and the left side surface are arranged with the normals of the surfaces intersect on the front side.

In an embodiment, an aspect may be allowed in which the inner side surface of the recessed portion is formed of a right side surface and a left side surface.

In an embodiment, an aspect may be allowed in which the inner side surface of the recessed portion is formed of a right side surface, a left side surface, and a back side surface, the right side surface and the left side surface are arranged distantly, and the right side surface and the back side surface and the left side surface and the back side surface are arranged so as to be partially connected.

In an embodiment, an aspect of further including an overhang portion (18; e.g., a front panel) which is disposed above the recessed portion and overhangs from the front side of the gaming machine body may be allowed.

In an embodiment, an aspect may be allowed whereby further comprising an access portion (24; e.g., an access door) on the inner side surface of the recessed portion, allowing access to the interior of the gaming machine body.

In an embodiment, an aspect may be allowed whereby at least a part of the end of the reflective object is in contact with the inner side surface of the recessed portion.

In an embodiment, an aspect may be allowed whereby the reflective object is formed of a light-transmissive material (e.g., acrylic resin).

In an embodiment, an aspect may be allowed whereby the reflective object is a light-transmissive panel, the gaming machine further comprising a light source (e.g., an LED) attached to an end face of the light-transmissive panel and emitting light from the end face.

Furthermore, an aspect may be allowed whereby the reflective object is an illuminant.

The invention claimed is:

1. A gaming machine comprising:
   a gaming machine body;
   a recessed portion formed on the gaming machine body, the recessed portion being recessed from a front side to a back side of the gaming machine body, and having an inner side surface, the inner side surface being a reflective surface; and
   a reflective object at least partially positioned in a space defined by the recessed portion, and formed with a reflected image from the reflective surface of the recessed portion.

2. The gaming machine according to claim 1, wherein the inner side surface of the recessed portion includes a planar right side surface positioned on a right side of the recessed portion when viewed from the front side and a planar left side surface positioned on a left side of the recessed portion when viewed from the front side, and the right side surface and the left side surface are arranged with the normals of the surfaces intersecting on the front side.

3. The gaming machine according to claim 1, further comprising an overhang portion which is provided above the recessed portion and overhangs from the front side of the gaming machine body.

4. The gaming machine according to claim 1, further comprising an access portion on the inner side surface of the recessed portion allowing access to an interior of the gaming machine body.

5. The gaming machine according to claim 1, wherein at least a part of an end of the reflective object is in contact with the inner side surface of the recessed portion.

6. The gaming machine according to claim 1, wherein the reflective object is formed of a light-transmissive material.

7. The gaming machine according to claim 6, wherein the reflective object is a light-transmissive panel, and further comprising a light source attached to an end face of the light-transmissive panel and emitting light from the end face.

8. The gaming machine according to claim 1, wherein the reflective object is an illuminant.

* * * * *